United States Patent
Huong

(10) Patent No.: US 6,928,700 B2
(45) Date of Patent: Aug. 16, 2005

(54) ROTATING SHAFT WITH RADIAL PRESS DEVICE

(75) Inventor: Chin-Fu Huong, Panchiao (TW)

(73) Assignee: Hing Basestrong Co., Ltd., Taipei Hsien (TW)

( * ) Notice: Subject to any disclaimer, the term of this patent is extended or adjusted under 35 U.S.C. 154(b) by 47 days.

(21) Appl. No.: 10/040,481

(22) Filed: Jan. 9, 2002

(65) Prior Publication Data

US 2003/0041413 A1 Mar. 6, 2003

(30) Foreign Application Priority Data

Sep. 5, 2001 (TW) ........................................ 90215200 U

(51) Int. Cl.⁷ .............................................. E05L 17/64
(52) U.S. Cl. .............................. 16/342; 16/341; 16/386
(58) Field of Search .......................... 16/342, 321, 325, 16/335, 341, 386, 337

(56) References Cited

U.S. PATENT DOCUMENTS

| | | | | |
|---|---|---|---|---|
| 2,304,223 A | * | 12/1942 | Westrope | 403/52 |
| 2,342,477 A | * | 2/1944 | Magenat | 220/835 |
| 4,491,899 A | * | 1/1985 | Fleming | 362/492 |
| 4,617,699 A | * | 10/1986 | Nakamura | 16/262 |
| 4,828,313 A | * | 5/1989 | Lanser et al. | 296/97.12 |
| 4,887,747 A | * | 12/1989 | Ostrowsky et al. | 222/556 |
| 5,632,066 A | * | 5/1997 | Huong | 16/338 |
| 5,967,587 A | * | 10/1999 | Collet et al. | 296/97.11 |
| 6,230,365 B1 | * | 5/2001 | Lu | 16/342 |
| RE37,712 E | * | 5/2002 | Gannon | |
| 6,470,532 B2 | * | 10/2002 | Rude | 16/335 |
| 6,513,197 B2 | * | 2/2003 | Rude et al. | 16/342 |

* cited by examiner

*Primary Examiner*—Suzanne Dino Barrett
*Assistant Examiner*—Mark Williams
(74) *Attorney, Agent, or Firm*—Troxell Law Office, PLLC

(57) ABSTRACT

A rotating shaft with radial press device comprises a cylindrical rod and at least a friction part. The cylindrical rod extends from the rotating shaft and provides at least a milled face. The friction part is a ring piece composed of a circular section and an arched section and a gap is formed between the circular section and the arched section. An axial hole is surrounded by both of the circular section and the arched section for accommodating the cylindrical rod. Further, the arched section has a gradually reduced inner radius. As soon as the cylindrical rod is tightly pressed by the arched section, a position of standstill can be formed and when the milled face touches the free end of the arched section, the cylindrical rod can moves in a direction so that the milled face keeps contact with the free end of the arched section in a state of locking automatically.

2 Claims, 2 Drawing Sheets

ROTATING SHAFT WITH RADIAL PRESS DEVICE

BACKGROUND OF THE INVENTION

1. Field of the Invention

The present invention relates to a rotating shaft with radial press device, and, particularly to a rotating shaft, which provides a function of automatic locking or a function of anti-bounce.

2. Description of Related Art

A consumptive electronic product with lifted lid such as a portable computer, an electronic dictionary, . . . , and so on mostly has a lower main unit to pivotally connect with an upper lifted lid by way of a rotating shaft so that the lid can be opened and shut relative to the main unit. Hence, the rotating shaft is an important element to determine if the consumptive electronic product is good or bad. In fact, an excellent rotating shaft has to keep in a state of being unloosened in addition to an effect of standstill.

Generally, the friction generated from the rotating shaft can be classified into two categories, the series connection mode and the fitting mode. The series mode is so-called axial friction and the U.S. Pat. No. 5,190,391 is a typical example for the axial friction. It is noted that the axial friction is not the way adopted in the present invention. The fitting mode of the friction is so-called radial friction and the U.S. Pat. No. 5,632,066 is a typical example for the radial friction. A conventional way of radial friction mostly has a male connecting member laterally extends a cylindrical rod and the rod has a horizontal groove at the center thereof. A female connecting member has an axial hole to fit with the rod tightly such that a friction torque generates between both the male connecting member and the female connecting member such that the rotating shaft offers a basic function of standstill. However, the prior art will become loose due to the wear-out at the contact area between the cylindrical rod and the axial hole after using a period of time. Even more, it is not possible for the prior art to provide the function of automatic locking or the function of the anti-bounce.

SUMMARY OF THE INVENTION

An object of the present invention is to provide a rotating shaft with radial press device, which comprises a cylindrical rod and at least a friction part. The cylindrical rod extends from the rotating shaft and provides at least a milled face. The friction part is a ring piece composed of a circular section and an arched section and a gap is formed between the circular section and the arched section. An axial hole is surrounded by both of the circular section and the arched section for accommodating the cylindrical rod. Further, the arched section has a gradually reduced inner radius. As soon as the cylindrical rod is tightly pressed by the arched section, a position of standstill can be formed and when the milled face touches the free end of the arched section, the cylindrical rod can moves in a direction so that the milled face keeps contact with the free end of the arched section in a state of locking automatically.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 2:
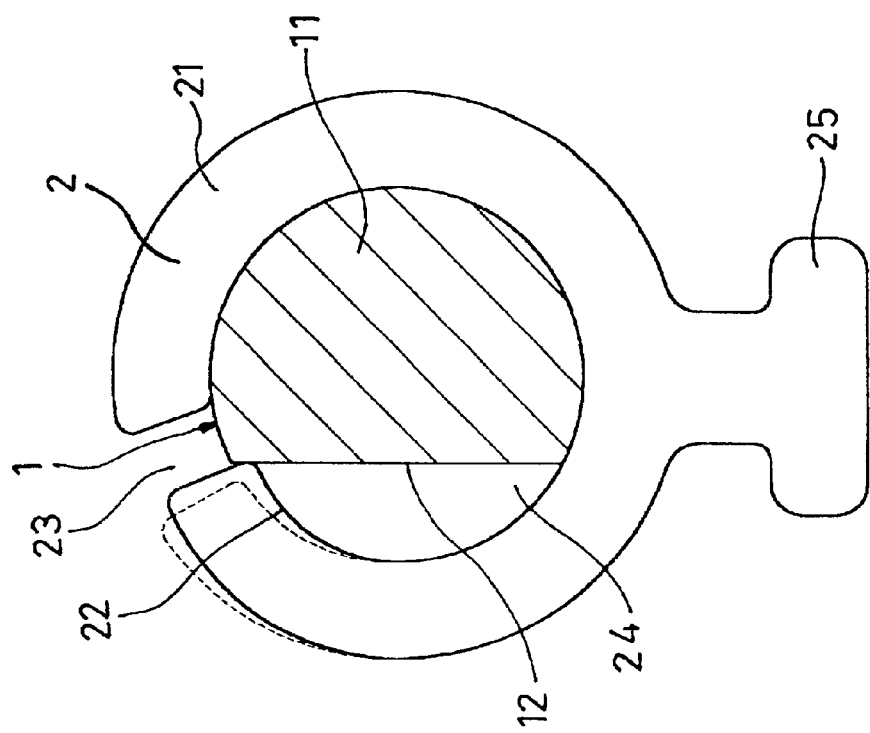
FIG. 2 is a sectional view of a rotating shaft of the present invention illustrating the rotating shaft associated with the friction part.
Figure 1:
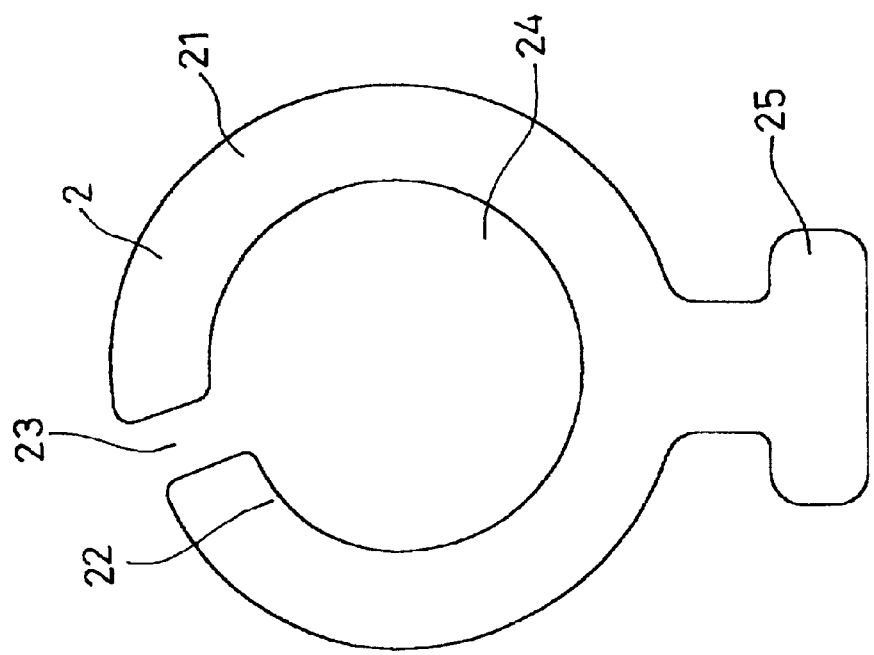
FIG. 1 is a front view of a friction part of the rotating shaft with radial press device according to the present invention.

Referring to FIGS. 1 to 4, a rotating shaft with a radial press device according to the present invention comprises a shaft part 1 and at least a friction part 2.

Wherein, the shaft part 1 (it is known and not shown) at an end thereof connects with an article such as a screen and at another end thereof transversely extends a cylindrical rod 11 for being inserted into an axial hole 24 of the friction part 2 and forming a circumferential contact. The difference of the cylindrical rod 11 from the conventional ones is in that at least a milled face 12 at the periphery thereof is provided.

The friction part 2 can be flat or cylindrical and connects with another article such as a main unit. The friction part 2 is composed of a circular section 21 and an arched section 22 with a gradually reduced radius and a gap 23 is between the circular section 21 and the arched section 22. Both of the circular section 21 and the arched section 22 surround the axial hole 24 so that the axial hole 24 can be inserted with and accommodates the cylindrical rod 11. Besides, the circular section 21 at the circumference thereof extends a fitting part 25 and the fitting part 25 has a shape of reversed T as shown in the figures to fit with an engaging groove in a bearing seat (it is conventional and not shown). In this way, a plurality of flatly shaped friction parts 2 can be fixedly attached to the bearing seat in a way of series connection so that the circular section 21 and the arched section 22 are covered in the bearing seat for offering a function of radial press.

Figure 3:
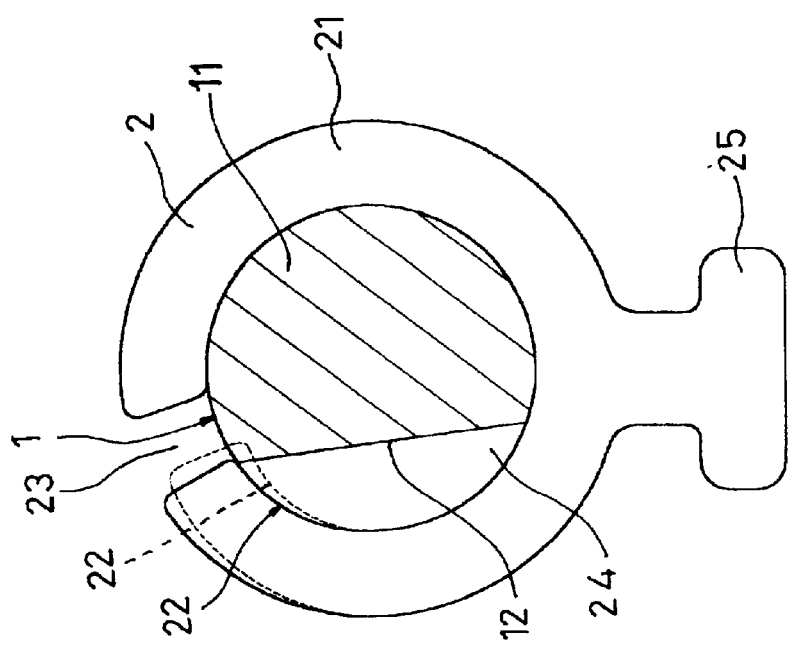
FIG. 3 is a sectional view similar to FIG. 2 illustrating the rotating shaft being in a state of operation.

Referring to FIGS. 2 and 3, as soon as the cylindrical rod 11 moves to a free end of the arched section 22, the arched section 22 can shrink due to an elastically restoring function so as to push the milled face 12 such that the cylindrical rod 11 can move clockwise to contact with the free end of the arched section 22 at the gap 23 and to be fixedly located in place. In this way, two articles, for example, being in a state of closing can be locked. Accordingly, the cylindrical rod 11 can be forced to rotate in a direction by a moment of force resulting from the elasticity of the arched section 22 so that a reversed rotation of the cylindrical rod 11 is prohibited. If it is required for the cylindrical rod 11 to rotate inversely, a greater moment of force has to have for overcoming a resistant force at both of the milled face 12 and the arched section before the cylindrical rod 11 can rotates counterclockwise.

Figure 4:
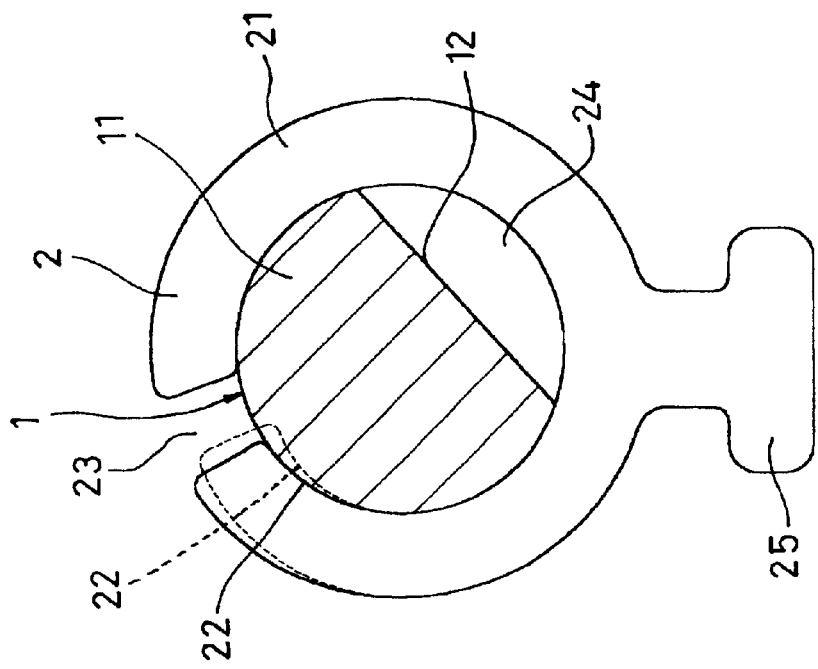
FIG. 4 is a sectional view similar to FIG. 2 illustrating the rotating shaft having moved an angular displacement.

Referring to FIG. 4, when the milled face 12 passes over the free end of the arched section 22, the cylindrical rod 11 at the circumference thereof is tightly pressed by the arched section 22 such that a friction torque can generate, that is, the cylindrical rod 11 can provide a position of standstill to allow two articles being in a state of opening to each other.

It is appreciated from the foregoing that the rotating shaft with radial press device according to the present invention provides a milled face on a cylindrical rod to move relative to an arched section of a friction part such that an automatic locking can be obtained while two articles are shut to each other. The arrangement of the present invention is suitable for a consumptive electronic product such as a notebook computer or a translation dictionary, which is not provided with catch device, so that the design and development costs for extra components can be saved and the assembly job can be reduced greatly due to the anti-bounce function of the present invention. Further, the friction torque generated due to the arrangement of the present invention can be increased or decreased in accordance with the number of the friction part and the entire length of the cylindrical rod to comply with the need of customer. In addition, it does not have to have one milled face on the cylindrical only so that multiple milled faces can be used for positioning two articles during opening or closing effectively. Furthermore, the inner diameter of the circular section can be smaller than the diameter of the cylindrical rod so as to increase the friction torque.

While the invention has been described with reference to a preferred embodiment thereof, it is to be understood that modifications or variations may be easily made without departing from the spirit of this invention, which is defined in the appended claims.

What is claimed is:

1. A rotating shaft with a locking device comprising:
   a cylindrical rod extending from the rotating shaft, the cylindrical rod having at least one flat miled face; and
   at least one friction part, each friction part having:
   i) a fitting part:
   ii) a circular section having a first end connected to the fitting part;
   iii) an arched section having a first end connected to the fitting part and the first end of the circular section;
   iv) an axial hole defined by the circular section and the arched section; and
   v) a gap located between a second end of the circular section and a second end of the arched section,
   the cylindrical rod being rotatably inserted through each axial hole, the arched section having a radius adjustable between a locked state and an unlocked state, wherein the second end of the arched section releasably engages the milled section of the cylindrical rod in the locked state and resiliently expands to engage an outer circumference of the cylindrical rod in the unlocked state as the cylindrical rod is rotated.

2. The rotating shaft with a locking device according to claim 1, wherein the at least one friction part includes a plurality of friction parts connected together.

* * * * *